Dec. 14, 1954 S. GOLDEN 2,696,710
IGNITER
Filed July 24, 1944
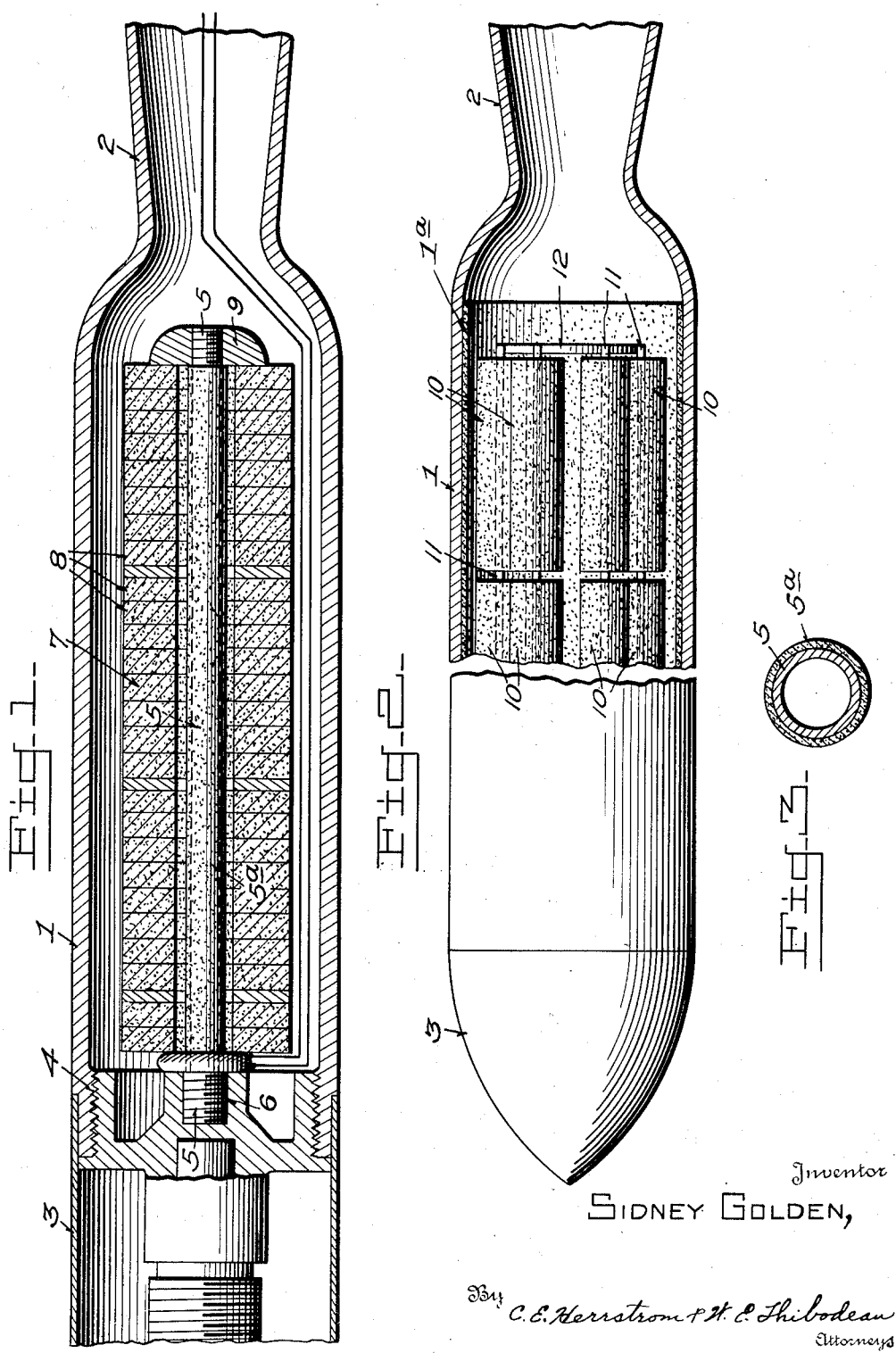
Inventor
SIDNEY GOLDEN,
By C. E. Herrstrom & H. E. Thibodeau
Attorneys

United States Patent Office 2,696,710
Patented Dec. 14, 1954

2,696,710

IGNITER

Sidney Golden, Cumberland, Md., assignor to the United States of America as represented by the Secretary of War Application July 24, 1944, Serial No. 546,337

2 Claims. (Cl. 60—35.6)

This invention relates to an igniter, more particularly to an igniter for rocket projectiles.

Igniters for jet propelled devices such as rocket projectiles generally consist of a suitable cloth bag, plastic cup, or other container filled with black powder plus an electric squib for igniting the powder. In these arrangements however, considerable difficulty is met in obtaining substantially uniform and simultaneous ignition of the propellent charge. This is especially true when utilizing a propellent charge comprising a plurality of discs or washers strung on a single trap rod and axially disposed within the rocket motor. Known igniters for this application required a comparatively large quantity of black powder which set up undesirably high pressures within the rocket motors upon ignition of such igniters. Such high pressure has a tendency to break up the propellent charge within the rocket motor chamber. Obviously, should this occur, the ballistics of the rocket projectile will be seriously affected.

Accordingly, it is an object of this invention to provide an igniter for a rocket propellant to uniformly and simultaneously ignite the propellent charge of a rocket projectile.

Another object of this invention is to provide an improved igniter for a rocket propellant utilizing substantially less igniter material than other forms of igniters.

A particular object of this invention is to provide an igniter for a rocket projectile for ignition of a rocket propellent charge comprising a plurality of powder grains in the form of discs or washers axially mounted on a single trap rod within the rocket motor of a rocket projectile.

The specific nature of the invention as well as other objects and advantages thereof will clearly appear from a description of a preferred embodiment as shown in the accompanying drawing in which:

Fig. 1 is a fragmentary longitudinal sectional view of a rocket projectile showing the igniter axially mounted when used in combination with a propellent charge comprising a stack of disk-like powder grains.

Fig. 2 is a side elevational view of a rocket projectile partly in longitudinal section showing the igniter applied to the inner walls of the projectile for igniting a propellent charge comprising a plurality of cylindrical powder grains mounted on trap wires disposed parallel to the axis of such projectile.

Fig. 3 is a cross sectional view of the igniter tube shown in Fig. 1.

This invention comprises an igniter composition composed of an intimate mixture of black powder uniformly dispersed in a combustible binding agent which is composed of nitrocellulose or a mixture of nitrocellulose and nitroglycerin. This invention further comprises igniting devices consisting of metallic members having this igniter compostion applied to their surfaces. This surface may conveniently take the form of tubes or rods and a coating of the igniter composition applied to the surface of such tubes or rods in such manner that the igniter composition will be disposed adjacent the propellent material to be ignited. The tubes or rods may also be used to support the powder grains, particularly when discs or washers of powder are utilized.

Referring to the drawing wherein similar numbers refer to similar parts, there is shown a rocket projectile embodying this invention. The rocket projectile comprises a tubular rocket motor 1 one end of which terminates in a nozzle 2 of conventional Venturi construction. A head 3 is secured to the forward end of rocket motor 1 as by threads 4. The head 3 is hollow and contains a "pay load" which may consist of a high explosive or a chemical grenade. A trap rod 5 is axially mounted within the rocket motor 1. The trap rod 5 preferably comprises a hollow tube threaded at each end. The forward end of trap rod 5 is screwed into a suitable threaded axial hole 6 in the base of head 3. A powder charge 7 surrounds the trap rod 5 and comprises a plurality of powder grains in the form of thin washers 8 or discs of suitable propellent material such as a double base powder. The powder grains are loosely strung on the trap rod 5 and are retained thereon by a nut 9 screwed on the free end of trap rod 5.

As previously stated the trap rod 5 is either surrounded with the igniting material or coated with such material. The igniter composition comprises a mixture of black powder and a solution of a single or double base powder. The single base or double base powder is readily dissolved in acetone or ether-alcohol. For example, a mixture of 60 parts by weight of black powder with approximately 300 parts by weight of a 10% solution of nitrocellulose in acetone provides an igniter composition that produces excellent ignition of a rocket projectile charge. This mixture is doughlike in consistency but when dried by permitting the acetone to evaporate it will produce a film or sheet consisting of 60 parts of black powder and 30 parts of nitrocellulose, the black powder being uniformly dispersed throughout the nitrocellulose. Several of these films can be laminated together by superficial softening of the surface with acetone to form strips of any desired thickness. Such strips can be placed directly in contact with the rocket propellant or tubes and rods of self-supporting character can readily be made.

Instead of using nitrocellulose, a composition of 60 parts of black powder mixed in a solution of 30 parts by weight of a double base powder, i. e., about 4 parts of nitroglycerin to 60 parts of nitrocellulose in 270 parts of acetone also provides a highly satisfactory igniter composition. After filming and drying of such a mixture, a film composed of double base powder is provided with the black powder uniformly dispersed throughout the double base powder matrix. The proportions stated above are merely illustrative and should not be construed as limiting the percentage of black powder to the single or double base powder to the percentages shown. The black powder can range from 50 to 90 percent of the final mixture, the remainder being the combustible nitrocellulose or nitrocellulose glycerin binder. This doughlike mixture of black powder and nitrocellulose or double base powder can be readily applied as a coating to trap rod 5 as shown in Fig. 1 which is used for trapping or supporting the propellent charge 7.

While an igniter composition of the type just described is preferably used with a propellent charge arrangement as shown in Fig. 1, the usefulness of such igniter composition is not limited to this form of propellent assembly. In Fig. 2 there is shown a rocket projectile in which the propellent assembly comprises a plurality of cylindrical powder grains 10 strung on a plurality of trap wires 11. The trap wires 11 are disposed parallel to the axis of the rocket projectile and are secured to the head 3 of the rocket projectile in a suitable manner. The cylindrical powder grains 10 are retained on trap wires 11 by a holding ring 12. The interior wall of rocket motor 1 is lined with the igniter mixture as previously described. This liner 1a may be separately formed and snugly fitted against the interior wall of rocket motor chamber 1. If desired, a thin coating of the igniter mixture may be applied to the inner surface of rocket motor chamber 1 in the form of a viscous mixture which adheres to the surface of the rocket motor chamber upon drying. It is therefore apparent that such an igniter composition may be applied to rockets in general and is not limited to any set form.

As the total amount of combustible material utilized in an igniter employing the igniter composition as herein described is quite small, it is readily apparent that excessive pressures will not be produced by the use of this type of igniter which would tend to adversely affect the propellent charge. As the igniter or igniting material can be made to surround the entire propellent charge or be placed within the center of such charge, such as a propellent charge of laminated discs or washers of powder grains, it is apparent that the greatest area of the powder charge can be substantially, instantaneously, and uniformly ignited with the result that the propellent charge will burn evenly and uniformly. Such ignition is essential for optimum operation of the rocket motor.

I claim:

1. In a rocket projectile, a propellent charge comprising a powder grain having an axial hole therethru, a trap rod passing thru said hole and thereby supporting said powder grain, and a coating of igniter composition on the surface of said trap rod comprising a matrix of a nitrocellulose-containing binder and black powder uniformly dispersed throughout the matrix, the black powder constituting at least half the total weight of the composition.

2. In a rocket projectile, a propellent charge comprising a powder grain having an axial hole therethru, a trap rod passing thru said hole and thereby supporting said powder grain and a coating of igniter composition on the surface of said trap rod comprising a matrix of gelatinized nitrocellulose and nitroglycerin, and black powder uniformly dispersed throughout the matrix, the black powder constituting at least half the total weight of the composition.

References Cited in the file of this patent

UNITED STATES PATENTS

| Number | Name | Date |
|---|---|---|
| 1,812,010 | McBride | June 30, 1931 |
| 1,897,948 | Young | Feb. 14, 1933 |
| 2,094,562 | Lowy | Sept. 28, 1937 |
| 2,239,051 | Pearsall et al. | Apr. 22, 1941 |

FOREIGN PATENTS

| Number | Country | Date |
|---|---|---|
| 503,078 | France | Mar. 8, 1920 |
| 207,540 | Switzerland | Nov. 15, 1939 |